US010383462B2

(12) United States Patent
Arakawa (10) Patent No.: US 10,383,462 B2
(45) Date of Patent: Aug. 20, 2019

(54) SAFETY HOOK

(71) Applicant: A.G.K., Ltd., Saitama (JP)

(72) Inventor: Hitoshi Arakawa, Saitama (JP)

(73) Assignee: A.G.K., LTD., Saitama (JP)

( * ) Notice: Subject to any disclaimer, the term of this patent is extended or adjusted under 35 U.S.C. 154(b) by 0 days.

(21) Appl. No.: 15/664,404

(22) Filed: Jul. 31, 2017

(65) Prior Publication Data

US 2018/0035830 A1 Feb. 8, 2018

(30) Foreign Application Priority Data

Aug. 2, 2016 (JP) ................... 2016-151658

(51) Int. Cl.
| | | |
|---|---|---|
| *A47G 1/20* | (2006.01) | |
| *F16B 45/02* | (2006.01) | |
| *F16B 45/04* | (2006.01) | |
| *A47G 1/16* | (2006.01) | |
| *F16G 11/04* | (2006.01) | |

(52) U.S. Cl.
CPC ............. *A47G 1/20* (2013.01); *A47G 1/1686* (2013.01); *F16B 45/02* (2013.01); *F16B 45/04* (2013.01); *F16G 11/04* (2013.01); *A47G 2001/207* (2013.01)

(58) Field of Classification Search
CPC .. A47G 1/20; A47G 2001/207; A47G 1/1686; B66C 1/36; F16B 45/02; F16B 45/04; F16B 45/00
USPC ...... 248/341; 24/373–376; 294/82.17, 82.19, 294/82.2–82.23
See application file for complete search history.

(56) References Cited

U.S. PATENT DOCUMENTS

| | | | | |
|---|---|---|---|---|
| 1,314,114 | A * | 8/1919 | Anderson | ............... B60C 27/08 213/208 |
| 1,347,369 | A * | 7/1920 | Hamrick | ................. F16B 45/02 24/600.2 |
| 1,516,875 | A * | 11/1924 | Allen | ...................... F16B 45/00 24/599.6 |
| 2,783,518 | A * | 3/1957 | Anderson | ................. B66C 1/36 24/599.2 |
| 3,611,515 | A * | 10/1971 | Raschke | ................... B66C 1/36 24/599.2 |
| 3,912,318 | A * | 10/1975 | Engh | ........................ B66C 1/36 24/599.2 |
| 7,316,380 | B2 | 1/2008 | Arakawa | |
| 7,472,881 | B2 | 1/2009 | Arakawa | |

(Continued)

FOREIGN PATENT DOCUMENTS

| | | |
|---|---|---|
| JP | 11-247948 | 9/1999 |
| JP | 2001-073081 | 3/2001 |
| JP | 2004-358228 | 12/2004 |

*Primary Examiner* — Christopher Garft
(74) *Attorney, Agent, or Firm* — Young & Thompson (57) ABSTRACT

This is to provide a safety hook 1 having a function of preventing and/or delaying removal of an exhibit 7 by unauthorized persons and a function of preventing unexpected display falling, and has good operability. The safety hook 1 has a grip body 17 capable to be fixed to a hanging wire 3, and a hook 23 for hanging an article, and connected to the body (17). Further, it has a hook cover 21 displaceable between a closed position for closing an opening portion 23z of the hook 23 and an open position for opening the opening portion 23z, and a cover cap 19 which hinders displacement of the hook cover 21 from the closed position to the open position.

11 Claims, 4 Drawing Sheets

(56) References Cited

U.S. PATENT DOCUMENTS

| | | |
|---|---|---|
| 7,562,856 B2 | 7/2009 | Arakawa |
| 7,617,649 B2 | 11/2009 | Arakawa |
| 2004/0227047 A1 * | 11/2004 | Arakawa ............... A47F 5/0006 248/317 |
| 2006/0243876 A1 | 11/2006 | Arakawa |
| 2007/0125015 A1 | 6/2007 | Arakawa |
| 2007/0125922 A1 | 6/2007 | Arakawa |
| 2007/0125924 A1 | 6/2007 | Arakawa |

* cited by examiner

Fig. 4

SAFETY HOOK

TECHNICAL FIELD

The present invention relates to a hook attached with a wire grip for hanging exhibits such as paintings, commodities, panels, etc. In particular, it relates to a safety hook having a function of preventing and/or delaying removal of exhibits by unauthorized persons (such as theft) and a function of preventing unexpected falling of the exhibits.

BACKGROUND ART

In display spaces such as museums and show windows, many hooks hanging exhibits such as paintings and commodities have been used. In addition, hooks attached with a wire grip that can place the hook at an arbitrary position (height) of the hanging wire have been also used frequently.

The present inventor has developed various kinds of such hooks attached with a wire grip (for example, see Patent document 1) and has also manufactured and sold safety hooks disclosed in FIG. 7 of Patent document 2, etc.

PRIOR ART DOCUMENTS

Patent Documents

Patent document 1: JP Hei. 11-247948A
Patent document 2: JP 2004-358228A

SUMMARY OF THE INVENTION

Problems to be Solved by the Invention

An object of the present invention is to provide a safety hook having a function of preventing and/or delaying removal of exhibits by unauthorized persons and a function of preventing unexpected falling of the exhibits, which is improved in operability. It is also an object to provide a safety hook that can release and activate the safety function without using tools or keys.

Means to Solve the Problems

In the section of the "Means to solve the problems" and "Claims", the reference numerals of the parts of the attached drawings are shown in parentheses, but this is merely for reference, and are not intended to limit to those in the attached drawings.

The safety hook (1) of the present invention comprises
a grip body capable to be fixed to a hanging wire (3),
a hook (23) for hanging an article, and connected to the grip body (17),
a hook cover (21) displaceable between a closed position for closing an opening portion (23z) of the hook (23) and an open position for opening the opening portion (23z), and
a cover cap (19) which hinders displacement of the hook cover (21) from the closed position to the open position.

In the safety hook (1) of the present invention, it is preferred to further provide a carabiner (karabiner)-shaped closing piece (25) for closing the opening portion (23z) of the hook (23). In addition, it is also preferred that the hook cover (21) and the cover cap (19) are non-detachably engaged and slidably engaged for a predetermined length with the grip body (17) and the hook (23).

In the specific embodiment of the present invention, the cover cap (19) is externally fitted to the grip body (17) so as to be slidable for a predetermined length,
a first female screw (19d) formed at the cover cap (19) and a male screw (17d) formed at the grip body (17) are screwed together so that both are unable to slide whereby displacement of the hook cover (21) from the closed position to the open position is hindered, and
a stepped portion (19t) is formed at the cover cap (19) to interfere with the male screw (17d) of the grip body (17) to prevent a slide of the cover cap (19) exceeding the predetermined length.

In the specific embodiment of the present invention,
the grip body (17) and the hook (23) are connected in a manner that the both are unable to be disconnected, and
the hook cover (21) and the cover cap (19) are unable to be removed to the direction of the hook (23).

Effects of the Invention

According to the present invention, it is possible to provide a safety hook having a function of preventing and/or delaying removal of exhibits by unauthorized persons and a function of preventing unexpected falling of the exhibits, and which has good operability.

EXPLANATION OF REFERENCE NUMERALS

1; Safety hook, 3; hanging wire, 5; hanging member, 7; exhibit,
11; stopper cap, 11b; upper portion, 11d; female screw, 11k; lower end surface,
13; stopper (middle pin), 13b; upper end portion, 13d; male screw,
13f; upper middle portion, 13h; inner hole, 13r; ball hole, 13v; spring hook portion,
15; ball, 16; coil spring,
17; grip body, 17b; upper end surface, 17c; upper port, 17d; male screw,
17g; upper outer periphery, 17f; upper half portion, 17h; tapered inner hole,
17k; middle outer periphery, 17m; straight inner hole, 17p; lower half portion,
17r; lower outer periphery, 17s; female screw, 17x; lower port, 17z; lower end,
19; cover cap, 19d; upper female screw (first female screw), 19g; upper portion,
19k; non-intervenient portion, 19m; middle portion, 19p; outer peripheral surface,
19s; lower female screw (second female screw), 19t; inner step portion,
19v; lower portion, 19z; lower end surface,
21; hook cover, 21b; upper end surface, 21g; ring portion, 21k; arm portion, 21r; cover portion, 21v; overlapping portion, 21x; hole, 21z; lower end surface,
23; hook, 23b; neck portion (connecting portion), 23d; male screw, 23f; stepped portion,
23h; hook root portion,
23k; carabiner hole, 23m; through hole, 23r; hook portion, 23t; bottom portion,
23v; rising portion, 23x; tip, 23z; hook opening portion,
25; carabiner-shaped closing piece, 25b; hole engaging portion, 25f; lower end portion.

EMBODIMENTS TO CARRY OUT THE INVENTION

Figure 3:
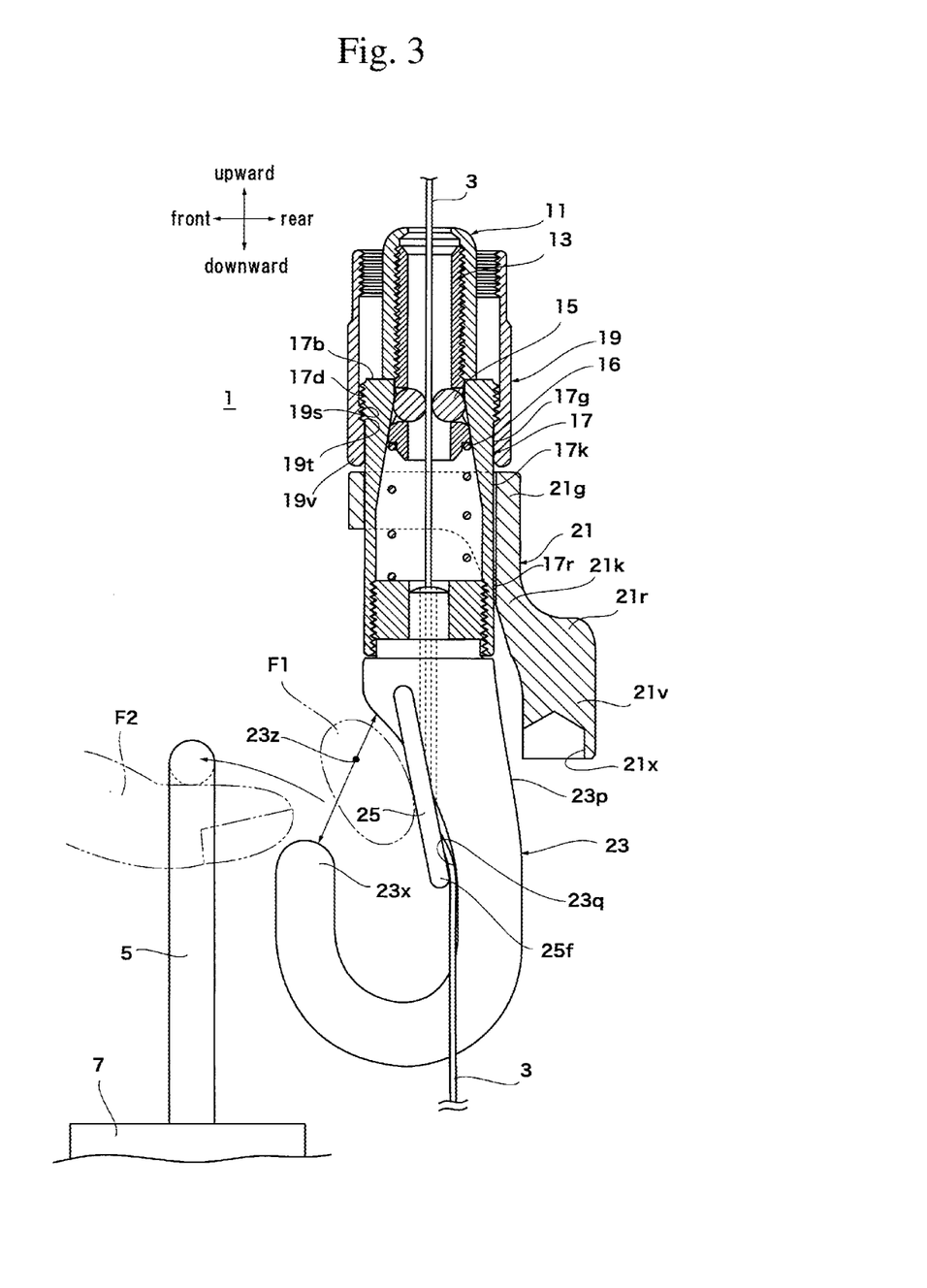
FIG. 3 is a side cross-sectional view of the safety hook 1 of FIG. 1 at an open position.

In the following, embodiments of the present invention will be described in detail with reference to the drawings. The meanings of the directions shown in each drawing are as follows. "Upward" and "downward" are upper and lower in the direction of gravity in a state in which an exhibit 7 is hung by a hanging wire 3 via a safety hook 1. "Front" is the side of a hook opening portion 23z of a hook 23 (the direction to which a hanging member 5 of the exhibit 7 is taken out from the hook 23 as shown in FIG. 3), and "rear" is the opposite side of "front".

Figure 1:
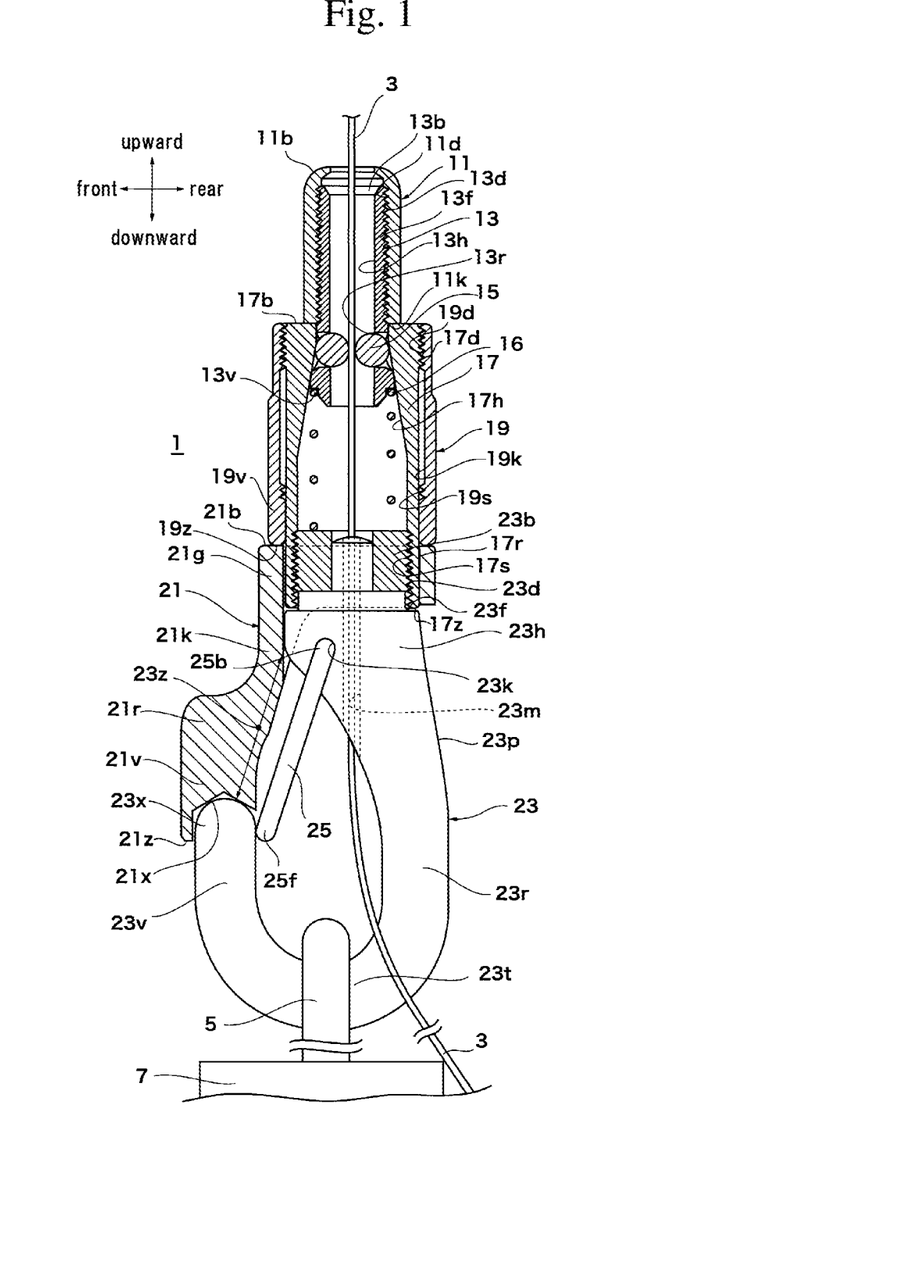
FIG. 1 is a side cross-sectional view of a safety hook 1 at a closed position according to an embodiment of the present invention.

The safety hook 1 of this embodiment comprises, as shown from substantially downward to upward in FIG. 1, a hook 23, a carabiner-shaped closing piece 25, a hook cover 21, a cover cap 19, a grip body 17, a coil spring 16, a stopper (middle pin) 13, balls 15 and a stopper cap 11. The safety hook 1 can be fixed at an arbitrary height position of the hanging wire 3, and hangs the exhibit 7 via the hanging member 5 at an adjustable height. In the following, each component will be explained in order. With regard to the reference numerals of the respective portions of the cover cap 19 and the grip body 17, please refer to FIG. 2.

Hook 23

It has a neck portion 23b (a connecting portion to the grip body 17) at the upper end portion, and has a fishhook-shaped hook portion 23r under thereof. The neck portion 23b is a short cylindrical shape, and a male screw 23d is threaded on the outer periphery. This male screw 23d is screwed with an adhesive to a female screw 17s (FIG. 2) of the grip body 17, and is substantially so connected that it is unable to be disconnected (nonreleasable connection).

Under the neck portion 23b, a hook root portion 23h is integrally connected. The hook root portion 23h has a larger size in a diameter than that of the neck portion 23b, and its upper end peripheral portion is a stepped portion 23f facing upward. With this stepped portion 23f, the lower end 17z (FIG. 2) of the grip body 17 contacts. A carabiner hole 23k penetrates through the portion near to the front side of the hook root portion 23h at a right angle to the front-rear direction. Into this carabiner hole 23k, a hole engaging portion 25b at the root of the carabiner-shaped closing piece 25, which is bent in the direction orthogonal to the paper surface of FIG. 1, is freely rotatably fitted.

A through hole 23m extending vertically is formed in the central portion of the hook root portion 23h and the neck portion 23b. The hanging wire 3 passes through the through hole 23m.

The lower half portion of the hook portion 23r has a semicircular shape, and the hanging member 5 made of a string or a metal member rests on the upper side (inner side) of the bottom portion 23t. A rising portion 23v is connected to the front side of the bottom portion 23t, and the upper end of the portion 23v is the tip 23x of the hook 23. The tip 23x enters into the hole 21x at the lower end of the cover 21 at the closed position of the hook cover 21.

Carabiner-Shaped Closing Piece 25

The closing piece 25 is V-shaped as a whole as seen in the front-rear direction of FIG. 1 (refer to JP 2004-358228A). The hole engaging portion 25b at the upper end of the closing piece 25 are bent inward (in the direction orthogonal to the paper surface of FIG. 1) at the both of the upper ends of the V-shape, and is freely rotatably fitted into the carabiner hole 23k of the hook 23.

The closing piece 25 is engaged with the hook root portion 23h in a state the piece 25 is elastically deforming from the natural posture to a shape slightly opening. And it is biased toward the clockwise direction of FIG. 1 like a spring around the hole engaging portion 25b at the upper end as a center, and the lower end portion 25f thereof is abutted to the inside of the rising portion 23v of the hook 23. As a result, the closing piece 25 closes the hook opening portion 23z in the natural state to prevent the hanging member 5 from escaping (going off). When the hanging member 5 is to be removed, the closing piece 25 is pushed with a finger to turn it in the counterclockwise direction to open the hook opening portion 23z as shown in FIG. 3.

Hook Cover 21

The hook cover 21 has a ring portion 21g at the upper end portion and a cover portion 21r extending obliquely front and downward (as viewed in FIG. 1) from the front side portion of the ring portion 21g. The ring portion 21g is an annular-shaped, and at the closed position of FIG. 1, it is fitted to the outside of a lower outer periphery 17r of the grip body 17. The ring portion 21g is capable of sliding up and down the outer periphery of the grip body 17, and is rotatable (in FIG. 3, it rises upward and the cover portion 21r turns to the rear side of the hook 23). With the upper end surface 21b of the ring portion 21g in the state of FIG. 1A, lower end surface 19z (FIG. 2) of the cover cap 19 is in contact.

As viewed in FIG. 1, an arm portion 21k integrally extends downward from the front side portion of the ring portion 21g. At under the arm portion 21k, the cover portion 21r and an overlapping portion 21v are connected. The overlapping portion 21v has an almost round columnar shape considerably bigger than that of the arm portion 21k, and an almost round columnar-shaped hole 21x is formed at a bottom end surface 21z of the overlapping portion 21v. Into the hole 21x, a hook tip 23x is fitted at the closed position of FIG. 1.

Cover Cap 19

Figure 2:
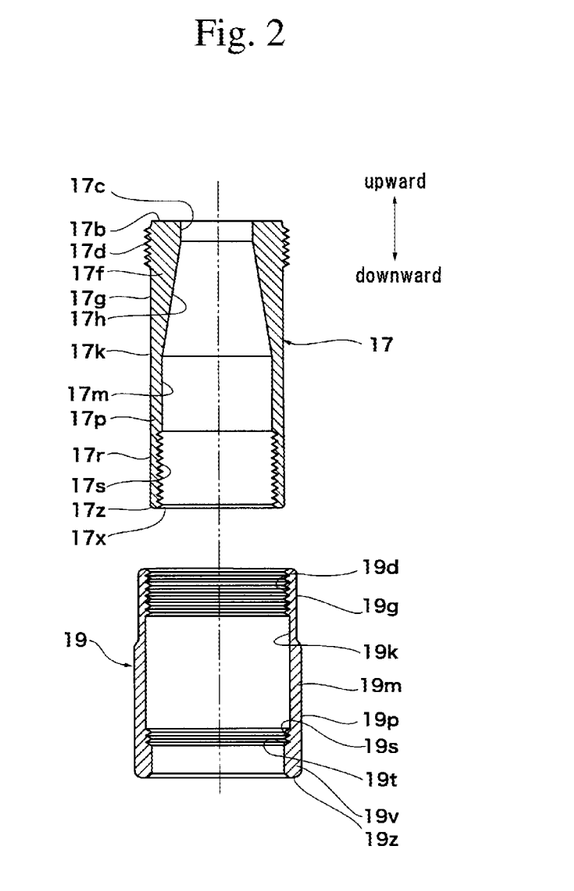
FIG. 2 is a side cross-sectional view of a grip body 17 and a cover cap 19 constituting the safety hook 1 of FIG. 1.

The cover cap 19 is, as shown also in FIG. 2, a relatively thin cylindrical member, and is fitted on the outside of the outer peripheral surface of the grip body 17. On the inner surface of an upper portion 19g of the cover cap 19, an upper female screw (first female screw) 19d is threaded. The upper female screw 19d is screwed with a male screw 17d on the upper outer surface of the grip body 17 at the closed position (FIG. 1), and the cover cap 19 is fixed at the lower limit position.

The cover cap 19 has a middle portion 19m (FIG. 2) in its middle part in the vertical direction. The inner surface of the middle portion 19m acts as a non-intervenient portion 19k having a larger diameter than that of the thread root of the above-mentioned upper female screw 19d. The non-intervenient portion 19k does not interfere with the above-mentioned male screw 17d of the grip body 17, and the cover cap 19 is capable of vertically moving in straight. A number of grooves (not shown in the drawing) are applied extending vertically to an outer peripheral surface 19p of the middle portion 19m and a lower portion 19v of the cover cap 19, in a knurled manner so that it is easy to turn with a finger.

On the upper portion of the inner surface of the lower portion 19v of the cover cap 19, a short lower female screw (second female screw) 19s of about one thread ridge is formed. The lower portion 19v other than the lower female screw 19s is a thick part to which no screw is threaded. The lower female screw 19s is screwed with the male screw 17d at the upper end portion of the grip body 17 at the open position shown in FIG. 3 to stop the cover cap 19 at the upper limit position. According to this constitution, it is not necessary to pinch the cover cap 19 with the fingers, so that the operator can concentrate on the operation of the hook cover 21, the carabiner-shaped closing piece 25 or the hanging member 5.

The portion of the lower portion 19v of the cover cap 19 at which no screw thread has formed acts as an inner step portion 19t (see FIG. 3), and prevents the cover cap 19 from coming off the grip body 17 to upward by a contact with the male screw 17d of the grip body 17. A lower end surface 19z of the lower portion 19v is in contact with an upper end surface 21b of the hook cover 21 at the closed position of FIG. 1, and the hook cover 21 cannot be raised upward.

Grip Body 17

The grip body 17 is also a hollow cylindrical member, and its outer peripheral surface is a straight cylindrical surface with the same diameter except for the male screw 17d at the uppermost portion. An inner hole 17h of an upper half portion 17f (excluding the uppermost portion, FIG. 2) of the grip body 17 is a tapered surface with spreading downward. Accordingly, the upper half portion 17f is thicker in the upper portion. An inner hole 17m of a lower half portion 17p of the grip body 17 is a straight cylindrical surface.

An upper end surface 17b of the grip body 17 is in contact with the lower end surface of the stopper cap 11 in the state of FIGS. 1 and 3. A male screw 17d is threaded at the uppermost portion of the outer peripheral surface of the grip body 17. This male screw 17d is screwed with an upper female screw 19d and a lower female screw 19s of the above-mentioned cover cap 19. Among the outer peripheral surfaces of the grip body 17, the portion immediately below the male screw 17d (upper outer periphery 17g), at the open position of FIG. 3, is externally fitted by an inner surface of a lower portion 19v of the cover cap 19. A middle outer periphery 17k under the upper outer periphery 17g and a lower outer periphery 17r thereunder are, at the open position of FIG. 3, in contact with an inner surface of a ring portion 21g or an arm portion 21k of the hook cover 21.

The inner hole of the grip body 17 has, as shown in FIG. 2, a straight upper port 17c, a tapered inner hole 17h with a tapered surface spreading downward, a straight inner hole 17m, a female screw 17s and a lower port 17x from the top. The tapered inner hole 17h is in contact with outer surfaces of balls 15 of the wire gripping mechanism, in which three balls are arranged at equal pitches in the circumferential direction, although two balls 15 are shown for simplicity of illustration. The balls 15 get closer to the center as they go above the tapered inner hole 17h of the grip body 17 (see FIG. 1 and FIG. 3), and is strongly pressed against the hanging wire 3 in the hole 17h to grip the hanging wire 3.

The female screw 17s is screwed attaching an adhesive with the male screw 23d on the outer periphery of a hook neck portion 23b, and is substantially so connected that it is unable to disconnect (unreleasable connection). Incidentally, the screwing (unreleasable connection) is carried out after incorporation of a stopper 13, the balls 15 and the coil spring 16 into the grip body 17, and after incorporation of the cover cap 19 into the outside of the grip body 17. It should be noted that "unreleasable connection" means that it cannot be unreleased by a usual screw disengaging form and releasing force. It does not mean that it is also unable to release the connection even in the case of applying a physical or chemical treatment that weakens an adhesive force of an adhesive or adding a huge force enough to destroy the adhesive (a state that cannot happen during usual use of the safety hook).

The lower end surface 17z of the grip body contacts with a stepped portion 23f between the neck portion 23b and the hook root portion 23h of the hook 23.

Coil Spring 16

The coil spring 16 is disposed so as to be pushed between the upper surface of the neck portion 23b of the hook 23 and the spring hook portion 13v at the lower end portion of the stopper 13. The coil spring 16 biases the stopper 13 upward, that is a direction in which the space between the plurality of balls 15 is narrowed.

Balls 15

Three balls 15 are arranged in three ball holes 13r opened at the side wall at the lower portion of the stopper 13 at equal pitches in the circumferential direction. In the figure, to facilitate understanding, two balls 15 are shown as though they are arranged to face each other. The outer surface of the balls 15 contact with the tapered inner hole 17h of the grip body 17, and the inner surface of the balls 15 are pressed to the hanging wire 3, as shown in FIG. 1 and FIG. 3, thus constructing the wire gripping mechanism.

Stopper 13

The stopper 13 is a hollow cylindrical body thinner than the grip body 17. Through the inner hole 13h of the stopper 13, the hanging wire 3 passes. A male screw 13d is threaded on the outer surface of the upper middle portion 13f of the stopper 13. A mechanism for gripping (fixing) the safety hook 1 at an arbitrary height position of the hanging wire 3 is constituted by the stopper 13, the balls 15, the coil spring 16 and the grip body 17. The grip is released by pushing the upper end portion 13b of the stopper 13 downward and pushing the stopper 13 into the grip body 17 (see FIG. 4).

Stopper Cap 11

Figure 4:
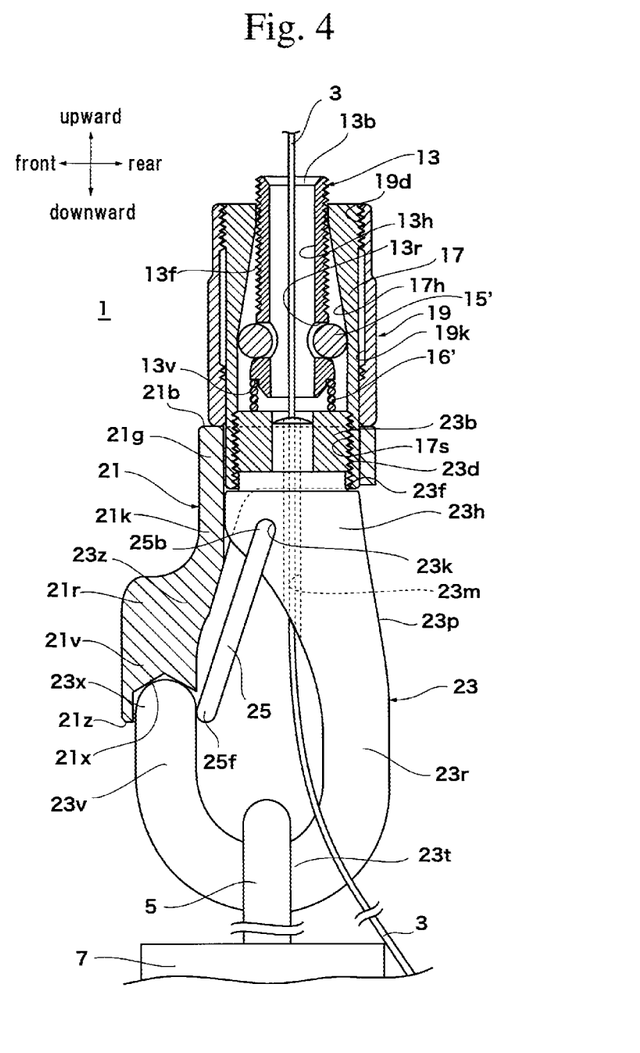
FIG. 4 is a side cross-sectional view of the state in which the safety hook 1 of FIG. 1 is at a closed position, and the hook 1 is slid up and down along a hanging wire 3 (a state in which the height of an exhibit 7 is adjusted).

The stopper cap 11 is a hollow cylindrical part having a somewhat narrowed upper portion 11b. A female screw 11d is threaded on the inner surface of the stopper cap 11. The female screw 11d is screwed with the male screw 13d of the stopper 13. A lower end surface 11k of the cap 11 contacts with the upper end surface 17b (FIG. 2) of the grip body 17 in the states of FIG. 1 and FIG. 3. When the stopper cap 11 covers the stopper 13 (FIG. 1 and FIG. 3), the stopper 13 cannot be pushed down and the grip of the hanging wire 3 cannot be released. When the cap 11 is removed from the stopper 13, the stopper 13 can be pushed down (FIG. 4). That is, the stopper cap 11 prevents unexpected lowering of the stopper 13 to release the grip.

Next, each state of the safety hook 1 (the closed position shown in FIG. 1, the open position shown in FIG. 3 and up and down slide at the closed position shown in FIG. 4) will be explained altogether.

At the closed position of the safety hook 1 of FIG. 1, the opening portion 23z of the hook 23 is closed doubly by both the cover portion 21r of the hook cover 21 and the carabiner-shaped closing piece 25. Accordingly, the hanging member 5 of the exhibit 7 cannot be removed from the hook 23, and unauthorized removal of the exhibit 7 (theft, etc.) is prevented.

For making the closed position of FIG. 1 to the open position of FIG. 3, the cover cap 19 is rotated and an upper female screw (first female screw) 19d of the cover cap 19 is unscrewed from the male screw 17d of the grip body 17. After it is unscrewed, the cover cap 19 is pulled up straightly upward. Then, the lower female screw (second female screw) 19s of the cover cap 19 is lightly stopped by about one thread ridge on the male screw 17d of the grip body 17. The safety hook 1 can be operated thereafter without supporting the cover cap 19 by the operator's fingers, so that it is convenient.

Incidentally, "going off" of the cover cap 19 upward from the state of FIG. 3 is prevented, as mentioned above, by abutment of the no-screw portion of the lower portion 19v of the cover cap 19 against the male screw 17d at the upper end portion of the grip body 17.

Next, the hook cover 21 is raised upward, and the overlapping portion 21v is removed from the hook tip 23x. Further, the hook cover 21 is pulled upward and turned by approximately 180 degrees to remove the cover portion 21r from the hook opening portion 23z. This is the state of the hook cover 21 in FIG. 3, and when the hook cover 21 is made free from this state, it falls downward by its own weight, and the arm portion 21k or the overlapping portion 21v is caught on the hook 23 and stops. Even in this state, the hook cover 21 is not overlapped to the hook opening portion 23z. In this manner, the hook cover 21 and the cover cap 19 are not disengaged from the safety hook 1 of the open position, so that there is no worry of falling those parts and it does not take time and labor to keep it in a pocket, etc.

Then, with the finger F1 (for example, the thumb of the left hand), the carabiner-shaped closing piece 25 is pushed rearward and turned in the counterclockwise direction, and the lower end portion 25f of the closing piece 25 contacts to the rear-side inner face 23q of the hook 23. In this manner, the hook opening portion 23z becomes open. At this time, the hanging member 5 is held on the finger F2 (for example, the index finger of the right hand) and is removed from the hook 23. According to this procedure, the exhibit 7 can be removed from the hook 23.

In this embodiment, the hook opening portion 23z is closed doubly by the hook cover 21 and the closing piece 25, and this is to prevent the hanging member 5 from unexpectedly falling off from the hook 23 at the time of attaching and detaching operations of the hanging member 5 in the open position of the hook cover 21 shown in FIG. 3.

In this embodiment, in the open position of FIG. 3, neither the hook cover 21 nor the cover cap 19 are disengaged from the safety hook 1 as mentioned above. Therefore, there is no fear of falling those parts during operation. Also, it is not necessary to keep the removed parts in pockets, etc., or take them out, and it is possible to remarkably reduce troubles and attention required for work. Further, neither the hook cover 21 nor the cover cap 19 requires a tool for moving, and there is no need to take out the tool and no care of falling it.

In this embodiment, as mentioned above, no specific tool or key is used to change the state of the safety hook 1 from the closed position of FIG. 1 to the open position of FIG. 3. Therefore, although it seems that the effect of anti-theft prevention seems to be low, in practice, it takes a certain length of time to operate the cover cap 19, the hook cover 21 or the carabiner-shaped closing piece 25 to change from the closed position to the open position, and during this time, watchmen or curators are aware of theft and can prevent it adequately.

FIG. 4 is a side cross-sectional view of the state in which the safety hook 1 of FIG. 1 is slid up and down along the hanging wire 3 (a state in which the height of the exhibit 7 is being adjusted) at the closed position. In this state, the stopper cap 11 is removed from the stopper 13. Then, by pushing the upper end portion 13b of the stopper 13 downward with a finger (not shown in the drawing) and pushing the stopper 13 into the grip body 17 (the coil spring 16' is contracted), the grip is released. That is, the balls 15' are located in a large-diameter portion of the lower portion of a tapered inner hole 17h of the grip body 17, and the balls 15' have move to the outside and detached from the hanging wire 3.

It should be noted that the present invention is not limited to the embodiment explained above, and various modifications and additions can be added.

The invention claimed is:
1. A safety hook which comprises:
   a hollow cylindrical grip body configured to be fixed at an adjustable position on a hanging wire,
   a hook connected to the grip body, for hanging an exhibit, the grip body and the hook being connected by a screw with an adhesive so that the grip body and the hook are unable to disconnect from each other,
   a hook cover displaceable between a closed position for closing an opening portion of the hook and an open position for opening the opening portion, the hook cover comprising a ring portion slidably fitted to an outside of an outer periphery of the grip body, and
   a cover cap which hinders displacement of the hook cover from the closed position to the open position,
   wherein the hook cover and the cover cap are each engaged non-detachably to said grip body for slidable movement along a predetermined length of said grip body, and
   the hook cover and the cover cap are unable to be removed from the grip body in a direction of the hook.
2. The safety hook according to claim 1, wherein the hook further comprises a carabiner-shaped closing piece for closing the opening portion of the hook.
3. The safety hook according to claim 2, wherein the hook cover and the cover cap are engaged slidably for a predetermined length and non-detachably with the grip body and the hook.
4. The safety hook according to claim 1, wherein
   the cover cap is externally fitted to the grip body so as to be slidable for a predetermined length,
   a first female screw formed at the cover cap and a male screw formed at the grip body are screwed together so that both are unable to slide whereby displacement of the hook cover from the closed position to the open position is hindered, and
   a stepped portion is formed at an inner surface of the cover cap to interfere with the male screw of the grip body to prevent a slide exceeding a predetermined length of the cover cap.
5. The safety hook according to claim 3, wherein
   the cover cap is externally fitted to the grip body so as to be slidable for a predetermined length,
   a first female screw formed at the cover cap and a male screw formed at the grip body are screwed together so that both are unable to slide whereby displacement of the hook cover from the closed position to the open position is hindered, and
   a stepped portion is formed at the cover cap to interfere with the male screw of the grip body to prevent a slide exceeding a predetermined length of the cover cap.
6. The safety hook according to claim 4, wherein
   a second female screw which screws with the male screw formed at the grip body that fixes a position of the cover cap at the open position, is formed at a position apart from a first female screw of the cover cap, the safety hook further comprising a non-intervenient portion formed between the first female screw and the second female screw that does not interfere with the male screw.

7. An assembling method, which comprises:
assembling the safety hook according to claim 1 by:
providing a grip body comprising a wire gripping mechanism, the wire gripping mechanism comprising a stopper, balls and a coil spring;
externally fitting the cover cap to the grip body; and
connecting the hook and the grip body.

8. A safety hook comprising:
a hollow cylindrical grip body configured to be fixed at an adjustable position on a hanging wire,
a hook connected to the grip body, for hanging an exhibit,
a hook cover displaceable between a closed position for closing an opening portion of the hook and an open position for opening the opening portion, the hook cover comprising a ring portion slidably fitted to an outside of an outer periphery of the grip body,
a cover cap that hinders displacement of the hook cover from the closed position to the open position,
a first female screw formed at the cover cap and a male screw formed at the grip body, the first female screw and the male screw being screwed together so that both the first female screw and the male screw are unable to slide, whereby displacement of the hook cover from the closed position to the open position is hindered, and
a second female screw that screws with the male screw formed at the grip body that fixes a position of the cover cap at the open position, the second female screw being formed at a position apart from a first female screw of the cover cap, wherein:
wherein the hook cover and the cover cap are each engaged non-detachably to said grip body for slidable movement along a predetermined length of said grip body, and the cover cap is externally fitted to the grip body,
a stepped portion is formed at an inner surface of the cover cap to interfere with the male screw of the grip body to prevent a slide exceeding a predetermined length of the cover cap, and
the safety hook further comprises a non-intervenient portion formed between the first female screw and the second female screw that does not interfere with the male screw.

9. The safety hook according to claim 8, wherein the hook further comprises a carabiner-shaped closing piece for closing the opening portion of the hook.

10. The safety hook according to claim 8, wherein:
the grip body and the hook are connected by a screw with an adhesive so that these are unable to disconnect from each other, and
the hook cover and the cover cap are unable to be removed from the grip body in a direction of the hook.

11. The safety hook according to claim 8, wherein:
the grip body and the hook are connected so that these are unable to disconnect, and
the hook cover and the cover cap are unable to be removed from the grip body in a direction of the hook.

\* \* \* \* \*